United States Patent Office 3,287,678
Patented Nov. 22, 1966

3,287,678
MINIATURE MAGNETIC CORES HAVING PERPENDICULAR ANNULAR RECESSES

Takashi Okamoto and Misao Takahashi, Tokyo, and Kouji Kawahara, Kawasaki-shi, Japan, assignors to Fujitsu Limited, Kawasaki, Japan, a corporation of Japan Filed Nov. 14, 1963, Ser. No. 323,709
Claims priority, application Japan, Nov. 17, 1962, 37/51,576, 37/68,970; May 6, 1963, 38/33,291
11 Claims. (Cl. 336—83)

Our invention relates to magnetic cores particularly for use as part of inductive elements in miniaturized electronic equipment.

Modern miniaturized communication equipment demands small high-quality inductances. However, the degree of inductance miniaturization is limited by the cost of high-quality magnetic material of unvarying and appropriate temperature coefficients, and by the losses inherent in such small size, as well as by the characteristics of the magnetic core. In addition the mounts necessary for holding the coils frequently occupy considerable space.

An object of the present invention is to provide a miniaturized core for inductances in miniaturized communication equipment.

Another object of this invention is to provide an arrangement which will reduce the size occupied by the inductances and appertaining members in a miniaturized communication system, and a more particular object to accomplish this while avoiding excessive coupling between individual inductances.

According to a feature of our invention, we divide a single core structure into integrally connected cores within which a number of coils can be mounted, and make the reluctance of each core sufficiently great to prevent cross-talk between the respective inductances.

Other features of novelty characterizing the invention are pointed out in the claims forming a part of this specification. Other objects and advantages of the invention will become obvious from the following detailed description of several embodiments of the invention when considered in light of the accompanying drawings, wherein:

Figure 1:
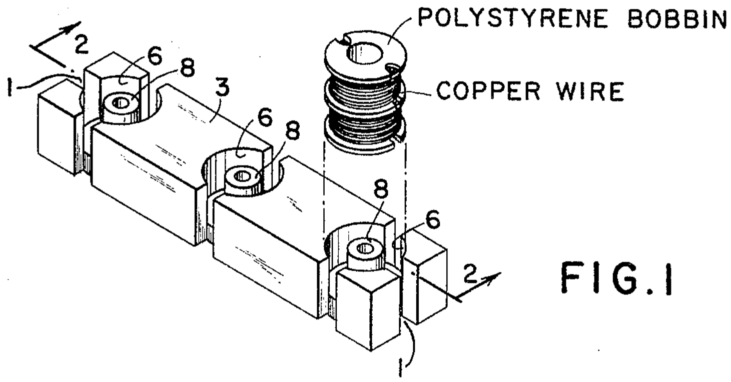
FIG. 1 is a perspective view of a core arrangement embodying features of this invention.

In FIG. 1, a solid core block 3 is provided with three annular depressions or recesses 6 forming three centrally-located parallel-upstanding core posts or stacks 8. The core posts 8 at their tops do not quite reach the upper surface level of the block 3 and each possess centrally located bores to permit slug tuning. When two such blocks 3 are secured together facing each other they form the shape shown in FIG. 2. The opposite coaxial core posts 8 are spaced from each other by respective gaps 2. The grooves 1 provide means for securing the magnetic cores together and onto a print plate for the miinaturized circuit so as to limit the amount of unused space. The inductance coils may be wound around the posts 8. As shown, the three posts 8 and their respective surrounding portions constitute three rectangular cores, which provide better characteristics than those of conventional magnetic cores. They are easily mounted on a print plate with fastening means occupying little space.

Figure 2:
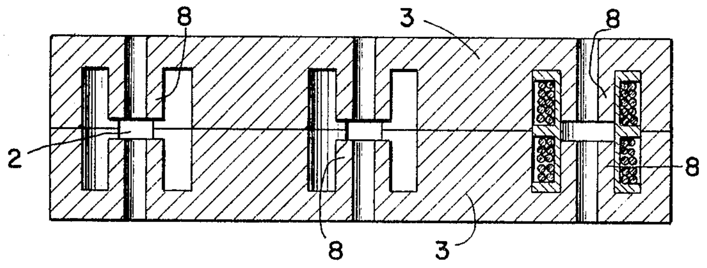
FIG. 2 is a section taken along the lines 2—2 of FIG. 1.
Figure 3:
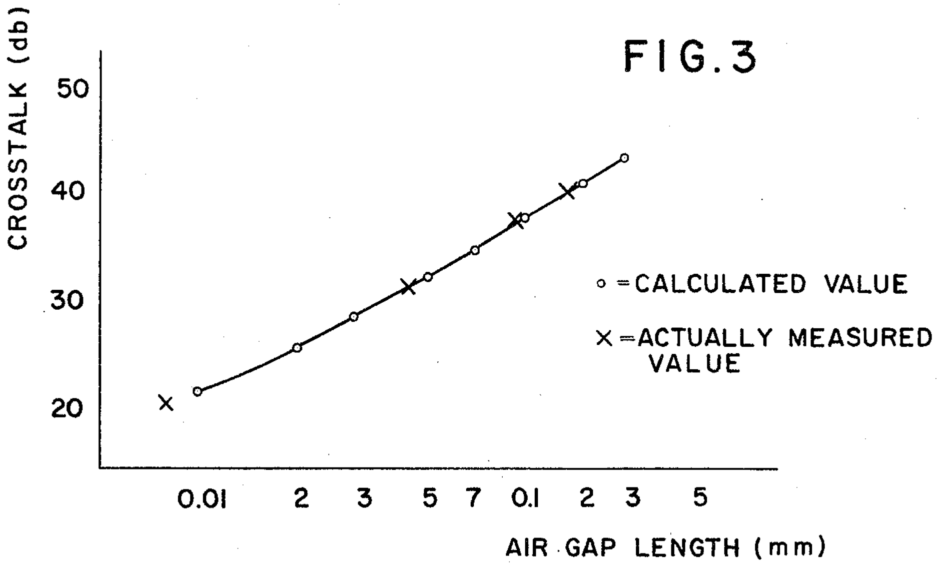
FIG. 3 is a curve illustrating the change in crosstalk between the various core sections depending upon the air gap length of the core arrangement in FIGS. 1 and 2.

Any cross-talk or electromagnetic coupling between adjacent cores is a function of the length of gaps 2 in FIG. 2. FIG. 3 illustrates the result of a study made of a 12 mm. x 11 mm. x 48 mm. core body accommodating four such integrally connected magnetic cores, and the results of tests made thereon. In the curve the *o*-dots represents the calculated cross-talk values, and the *x*-dots represent the measured cross-talk values, for different lengths of the air gaps 2. As seen from the curve in FIG. 3 the actually measured values correspond closely to the curve of the calculated values. If the main gap length is more than .1 mm. the electromagnetic coupling is less than 1%. Also, it has been found that between units separated by one or more other units, the electromagnetic coupling is reduced to .02 to .03%. For ordinary filters such decoupling is sufficient for practical use in miniature circuits. The gap length, of course, must be limited in actual use, not only on the basis of the permissible intercoupling, but also on the permissible losses, temperature coefficient, other electrical characteristics of the coil, and required magnetic core size.

Figures 4, 5, 6, 7, 8:
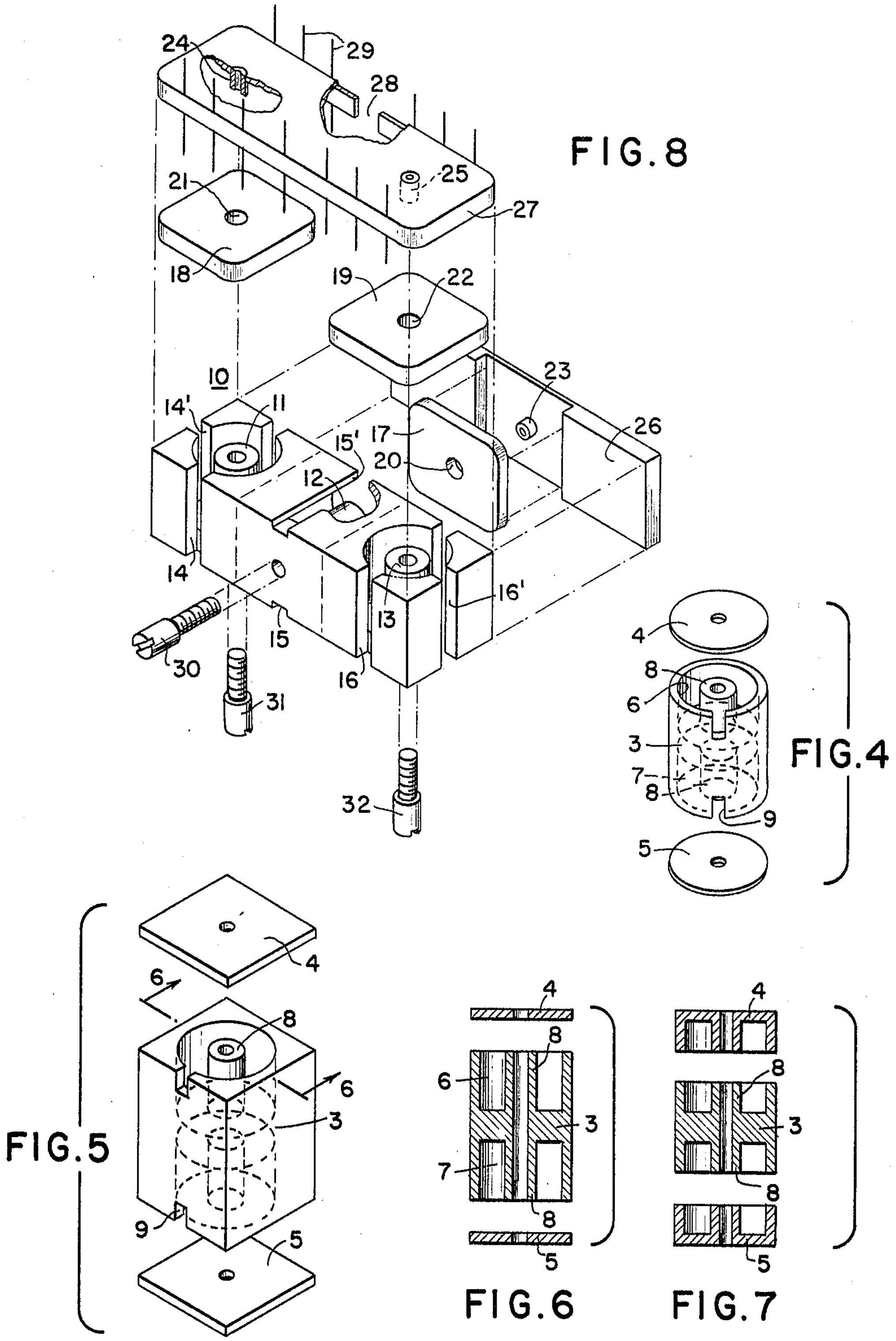
FIG. 4 is a perspective view of another core arrangement embodying features of this invention.
FIG. 5 is a perspective view of another arrangement embodying features of the invention.
FIG. 6 is a section taken along the lines 6—6 of FIG. 5.
FIG. 7 is a sectional view of another core arrangement embodying features of the invention.
FIG. 8 is an exploded perspective view of still another embodiment of the invention.

FIGS. 4 to 7 show three other embodiments of the invention. In FIG. 4 two magnetic core units are formed from a cylindrical magnetic core body 3 having respective annular recesses in the opposite ends thereof and forming opposite, divergent core posts 8. The posts 8 and recess cross sections are coaxial and symmetrical. Covering the units at each end are magnetic core caps 4 and 5 upon which can rest the coil parts. A number of such cores can be stacked sideways or vertically to produce a miniaturized core set. An extension groove 9 may be provided to adjust the magnetic inductance.

FIG. 5 illustrates a construction of the rectangular pot type having features similar to that of FIG. 4. FIG 6 is a cross section of FIG. 5. In FIG. 7 the construction is similar to that of both FIGS. 4 and 5 with the exception that the cover portions 4 and 5 are thicker and possess annular grooves which match the recesses in the block 3. The gaps formed between the stems 8 and the adjacent portions limit the cross-talk or intercoupling between the core portions.

If drastic decoupling between the magnetic core units greater than the decoupling of FIGS. 1 to 7 is required, the arrangement of FIG. 8 is applicable. In FIG. 8 a rectangular core block 10 possesses three annular depressions transverse to the length of the block. The two extreme depressions are perpendicular to the median depression and form two parallel upstanding core posts 11 and 13 as well as a cylindrical core post 12 extending transverse to the posts 11 and 13. Each post 11, 12, 13 is not quite long enough to reach the level of the core surface toward which it extends. Grooves 14 are provided parallel to the post 11, grooves 15 parallel to the post 12 and grooves 16 parallel to the post 13. Completing each of the magnetic cores are respective end plates 18 and 19 for the extreme cores and end plated 17 for the median core, all being made of the same material as the body 10 and having respective centered bores 21, 22 and 20. Center bores are also provided for the posts 11, 12 and 13.

A magnetic core supporting plate 27 of non-magnetic material having an edge partially embracing members 18 and 19, holds two projections 24 and 25 which pass into the bores 21 and 22 of members 18 and 19 so as to hold these onto the plate 27. The thickness of the members 18 and 19 is such as to be level with the edge of plate 27 when the members 18 and 19 are fitted into the plate 27. A second plate 26 of non-magnetic material possesses a central groove to receive the end plate 17 which is held by a projection 23 passing through the bore 20 of said end plate. The members are assembled into a compact rectangle.

The support plate 27 also possesses a groove 28 for passage of wires from the magnetic core center 12. At the same time a plurality of terminals 29 on the outer periphery of the plate 27 serve for connecting the wires in the interior of the core to outside connections. To accommodate this the print plate can have terminals directly engaging the terminals 29 on the plate 27.

Three adjusting slugs 30, 31 and 32 may be inserted into the bores of the centers 11, 12 and 13 from the direction shown in FIG. 8 to slug tune the inductances of the respective cores. The inductances are also affected in each case by the gaps existing between the posts 11, 12 and 13 and the respective members 18, 17 and 19 due to the short length of the posts. These gaps also prevent intercoupling.

The shape of the core arrangement in FIG. 8 is continuous and rectangular so as to reduce the space necessary to support the inductances. Also the total number of parts as well as the number of manufacturing steps is reduced. In manufacturing, since the size of the plates 26 and 27 is as large as the entire unit, the thickness to be ground does not become a problem despite the large surface of the body.

In FIG. 8, where a number of magnetic cores are combined into a single unit, the electromagnetic coupling is severely decreased because the adjacent magnetic cores are shifted 90° relative to each other. This decoupling is aided by the large magnetic resistance of the gaps between members 11 and 18, members 12 and 17, and members 13 and 19. According to actual coupling measurements between adjacent magnetic cores, when the gap length is about .1 mm. in a 14 mm. x 14 mm. x 56 mm. core body having four magnetic core sections, the intercoupling is approximately .0003 to .001%. This compares favorably to the intercoupling of about .01% for .1 mm. gaps in a magnetic core body with separate cores having parallel axes. Essentially in FIG. 8 the magnetic cores are entirely independent although mounted within a single core body.

Thus, according to the invention, small size cores make possible small inductances which can perform filter and other network functions in miniaturized electronic equipment.

The members 3, 4, 5, 18, 19 and 20 are made of ferromagnetic materials such as Mn–Zn or NiZn ferrite. The members 26 and 27 are insulators of molded plastic such as polycarbonate resin into which members 24 and 25 are molded. Members 30, 31, 32 include a screw of non-ferro-magnetic material such as ebonite and polystyrene and a ferro-magnetic tube into which the screw is inserted.

While various embodiments of the invention have been described in detail, it will be obvious to those skilled in the art that the invention may be embodied otherwise without departing from its spirit and scope.

We claim:

1. A core arrangement, comprising a core body of magnetic material having a first side surface and a second side surface at substantially right angles to said first side surface and a plurality of annular recesses formed therein in spaced relation to each other, one of said annular recesses opening at and having an axis perpendicular to said first side surface and another of said annular recesses opening at and having an axis perpendicular to said second side surface, each of said annular recesses forming an axially extending post.

2. A core arrangement as claimed in claim 1, wherein adjacent ones of said annular recesses are positioned with their axes perpendicular to each other.

3. A core arrangement as claimed in claim 1, wherein a pair of annular recesses is formed in said core body in spaced relation to each other, each of said pair of annular recesses opening at and having an axis perpendicular to said first side surface and parallel to the axis of the other, and wherein another annular recess is formed in said core body in spaced relation to and between said pair of annular recesses, said other annular recess opening at and having an axis perpendicular to said second side surface and perpendicular to the axes of said pair of annular recesses.

4. A core arrangement as claimed in claim 1, wherein each of said axially extending posts ends a short distance from the side surface at which it opens.

5. A core arrangement as claimed in claim 4, wherein each of said posts has an axial bore formed therein.

6. A core arrangement as claimed in claim 5, further comprising tuning means coaxially positioned in each of said axial bores and movable in axial direction for slug tuning said posts.

7. A core arrangement as claimed in claim 1, wherein said core body is of magnetic material of rectangular parallelepiped configuration.

8. A core arrangement at claimed in claim 3, wherein each of said annular recesses forms an axially extending post ending a short distance from the side surface at which it opens.

9. A core arrangement as claimed in claim 8, wherein each of said posts has an axial bore formed therein.

10. A core arrangement as claimed in claim 9, further comprising tuning means coaxially positioned in each of said axial bores and movable in axial direction for slug tuning said posts.

11. A core arrangement as claimed in claim 3, wherein said core body is of magnetic material of rectangular parallelepiped configuration.

References Cited by the Examiner

UNITED STATES PATENTS

| | | | |
|---|---|---|---|
| 1,803,868 | 5/1931 | Porter | 336—83 |
| 2,413,201 | 12/1946 | Tillman | 336—83 X |
| 2,912,657 | 11/1959 | Schaevitz | 336—30 |
| 2,949,591 | 8/1960 | Craige | 336—208 X |

FOREIGN PATENTS 1,155,492 10/1963 Germany.

LEWIS H. MYERS, *Primary Examiner.*

ROBERT K. SCHAEFER, *Examiner.*

T. J. KOZMA, *Assistant Examiner.*